L. S. White,
Knife Handle.
N° 53,546. Patented Mar. 27, 1866.
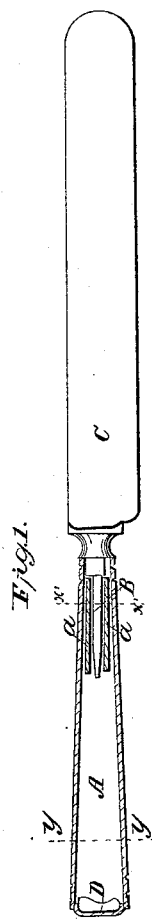
Fig. 1.
Fig. 2.
Fig. 3.
Witnesses:
Inventor:
L. S. White

UNITED STATES PATENT OFFICE.

LE ROY S. WHITE, OF WATERBUBY, CONNECTICUT, ASSIGNOR TO HIMSELF, ROGERS & BROTHER, AND GREEN KENDRICK, OF SAME PLACE.

METALLIC HANDLES FOR CUTLERY.

Specification forming part of Letters Patent No. 53,546, dated March 27, 1866; antedated March 2, 1866.

*To all whom it may concern:*

Be it known that I, LE ROY S. WHITE, of Waterbury, in the county of New Haven and State of Connecticut, have invented a new and useful Improvement in Metallic Handles for Cutlery; and I do hereby declare that the following is a full, clear, and exact description thereof, which will enable those skilled in the art to make and use the same, reference being had to the accompanying drawings, forming part of this specification, in which—

Figure 1 is a longitudinal section of a metallic handle applied to a table-knife according to my invention, taken in the line $x\ x$, Fig. 2; Fig. 2, a transverse section of the same, taken in the line $x'\ x'$, Fig. 1; Fig. 3, a transverse section of the same, taken in the line $y\ y$, Fig. 1.

Similar letters of reference indicate corresponding parts.

This invention relates to a new and useful improvement in metallic handles for cutlery, and is more especially designed for table-cutlery, (knives and forks,) although applicable to other knives.

The invention relates to an improvement in the construction of the handle and the method of soldering or uniting the handle and tang.

The metal handle is made with an open outer end in order that the solder, by which the tang of the implement is secured in the handle, may be properly adjusted within the handle after the tang of the blade is placed therein, and also to admit of the implement being perfectly balanced and to facilitate the attaching of the handle to the tang. The end being open enables the workman to see that the tang is securely soldered to the handle.

A represents my improved handle, composed of a metal tube drawn down, swaged, or otherwise operated upon to have the desired form or shape. Both ends of this tube are open, and the smaller or inner end is fitted on the tang B of the knife, and solder $a$ inserted in the handle at its outer open end, the handle being then subjected to heat so as to cause the solder to fuse and secure the handle to the tang.

In consequence of the handle A being constructed with an open end it will be seen that the solder can be easily inserted in the open end after the tang is in place. After the heat is applied some of the solder escapes at the junction of the small end of the handle with the bolster of the blade, and often so much of it escapes that more must be inserted to make the handle secure. In the old way the handle has to be taken off the tang to insert more solder. It will be seen, also, that the knife may be balanced with the greatest precision by the insertion of a greater or less quantity of solder in the handle, the open end affording every facility for that purpose.

The open end of the handle in my improvement is closed by a cap, D, secured to the body of the handle by solder or otherwise.

One of the difficulties of soldering on the handles made in the old way is that after the solder begins to melt and flow around the tang it makes the joints air-tight, and as the heat requires to be continued to insure the perfect soldering of the parts, it expands the inside of the tight handle and escapes by blowing out more or less of the solder, sometimes enough to let the blade drop out of the handle, and there is consequently no certainty of having enough solder remaining in the handle to make its connection with the blade secure.

I claim as new and desire to secure by Letters Patent—

1. The method of effecting the soldering of the tang of table and other cutlery in tubular metallic handles by inserting the solder at or through the rear open end of the latter, substantially as described.

2. Constructing and applying the cap D, as described.

LE ROY S. WHITE.

Witnesses:
M. M. LIVINGSTON,
C. L. TOPLIFF.